(12) United States Patent
Otaka et al.

(10) Patent No.: US 9,658,120 B2
(45) Date of Patent: May 23, 2017

(54) CAPACITANCE-TYPE SENSOR SHEET, METHOD FOR MANUFACTURING CAPACITANCE-TYPE SENSOR SHEET, AND SENSOR

(71) Applicant: Bando Chemical Industries, Ltd., Hyogo (JP)

(72) Inventors: Hideo Otaka, Hyogo (JP); Hideyuki Kato, Hyogo (JP); Hideki Norisada, Hyogo (JP); Takayuki Nagase, Hyogo (JP)

(73) Assignee: Bando Chemical Industries, Ltd., Hyogo-Ken (JP)

( * ) Notice: Subject to any disclaimer, the term of this patent is extended or adjusted under 35 U.S.C. 154(b) by 0 days.

(21) Appl. No.: 14/431,282

(22) PCT Filed: Jul. 2, 2013

(86) PCT No.: PCT/JP2013/068143
§ 371 (c)(1),
(2) Date: Mar. 25, 2015

(87) PCT Pub. No.: WO2014/050245
PCT Pub. Date: Apr. 3, 2014

(65) Prior Publication Data
US 2015/0268106 A1    Sep. 24, 2015

(30) Foreign Application Priority Data

Sep. 28, 2012  (JP) .................................. 2012-218707
Apr. 1, 2013   (JP) .................................. 2013-076221

(51) Int. Cl.
*G01L 1/00*   (2006.01)
*G01L 1/10*   (2006.01)
(Continued)

(52) U.S. Cl.
CPC .............. *G01L 1/142* (2013.01); *G01L 1/146* (2013.01); *G06F 3/044* (2013.01); *G06F 2203/04103* (2013.01)

(58) Field of Classification Search
CPC . H01L 41/29; H01L 41/0478; H01L 51/0012; H01L 51/0048; H01L 51/0545;
(Continued)

(56) References Cited

U.S. PATENT DOCUMENTS

2006/0108896 A1    5/2006   Nanataki et al.
2010/0033196 A1*   2/2010   Hayakawa ............... G01B 7/22
                                                          324/686

(Continued)

FOREIGN PATENT DOCUMENTS

JP    2006-147840 A    6/2006
JP    2008-187079 A    8/2008
(Continued)

OTHER PUBLICATIONS

PCT Application No. PCT/JP2013/068143 Written Opinion mailed Aug. 27, 2013.
(Continued)

*Primary Examiner* — Harshad R Patel
*Assistant Examiner* — Brandi Hopkins
(74) *Attorney, Agent, or Firm* — Lewis Roca Rothgerber Christie LLP

(57) ABSTRACT

A capacitance-type sensor sheet used for measuring an amount of stretch deformation and strain and/or distribution of stretch deformation and strain may include a dielectric layer made of an elastomer, an obverse-side electrode layer laminated on the obverse surface of the dielectric layer, and a reverse-side electrode layer laminated on the reverse surface of the dielectric layer. The obverse-side electrode layer and the reverse-side electrode layer may each contain
(Continued)

carbon nanotubes and the average thickness of the each of obverse-side electrode layer and the reverse-side electrode layer may be 0.1 μm or more and 10 μm or less. The obverse-side electrode layer and the reverse-side electrode layer may be formed by applying a coating solution containing carbon nanotubes. The obverse-side electrode layer and the reverse-side electrode layer may each include a plurality of band-shaped bodies.

9 Claims, 7 Drawing Sheets

(51) Int. Cl.
*G01L 1/14* (2006.01)
*G06F 3/044* (2006.01)
(58) Field of Classification Search
CPC .... H01L 51/0541; H01L 41/04; H01M 4/139; H01M 4/622; H01M 4/663; H01M 4/13; H01M 4/621; H01M 4/625; H01G 11/32; Y02P 70/54; Y02E 60/13; B82Y 10/00; B82Y 40/00; B82Y 30/00; C01B 2202/02; C01B 2202/34; C01B 2202/08; C01B 31/0233; C01B 7/16; G06F 3/044; H03K 2017/9602; H03K 2217/960755; H03K 17/962; H03K 2017/9604; Y10T 29/49124; Y10T 428/31504; Y10T 428/31544; G01L 1/142; G01L 5/00; G01L 1/14; G01L 1/146; F01B 29/10; B32B 27/18; B32B 27/308; B32B 27/08; B32B 27/304; B32B 27/322; H01B 1/122; H01B 1/06; F03G 7/005; B81B 3/0008; B81B 2201/042; B81B 3/0086; G02B 26/0841

USPC ............ 73/780; 428/422; 310/324; 977/843, 977/750; 345/174
See application file for complete search history.

(56) References Cited

U.S. PATENT DOCUMENTS

| | | | |
|---|---|---|---|
| 2010/0044122 A1* | 2/2010 | Sleeman | G01D 5/2405 178/18.06 |
| 2011/0006787 A1 | 1/2011 | Kadono | |
| 2011/0025171 A1 | 2/2011 | Goto et al. | |
| 2012/0032916 A1 | 2/2012 | Enoki | |
| 2012/0321785 A1 | 12/2012 | Rogers et al. | |
| 2013/0147752 A1* | 6/2013 | Simmons | G06F 3/044 345/174 |

FOREIGN PATENT DOCUMENTS

| | | |
|---|---|---|
| JP | 2009-528254 A | 8/2009 |
| JP | 2010-043881 A | 2/2010 |
| JP | 2010-244772 A | 10/2010 |
| JP | 2011-017626 A | 1/2011 |
| JP | 2011-075322 A | 4/2011 |
| WO | WO2009/128546 | 10/2009 |

OTHER PUBLICATIONS

PCT Application No. PCT/JP2013/068143 International Preliminary Report on Patentability dated Mar. 31, 2015.
PCT Application No. PCT/JP2013/068143 International Search Report and Written Opinion mailed Aug. 27, 2013.

* cited by examiner

CAPACITANCE-TYPE SENSOR SHEET, METHOD FOR MANUFACTURING CAPACITANCE-TYPE SENSOR SHEET, AND SENSOR

CROSS-REFERENCE TO RELATED APPLICATION

This application is a national phase application of PCT application number PCT/JP2013/068143 filed Jul. 18, 2013, which claims the priority benefit of Japanese patent application number JP 2012-218707 filed Sep. 28, 2012 and Japanese patent application number JP 2013-076221 filed Apr. 1, 2013, the entire disclosures of which are incorporated herein by reference.

BACKGROUND

Technical Field

The present invention relates to a capacitance-type sensor sheet used for measuring an amount of stretch deformation and strain and/or distribution of stretch deformation and strain, and a method for manufacturing the capacitance-type sensor sheet.

Background Art

The capacitance-type sensor sheet can detect a concavo-convex shape of a measuring object from changes in capacitance between a pair of electrode layers, and can be used for contact-pressure distribution sensors and sensors such as a strain gage. In general, the capacitance in a capacitance-type sensor is represented by the following formula (1):

$$C = \epsilon_0 \epsilon_r S/d \qquad (1)$$

In the above formula, C represents a capacitance, $\epsilon_0$ represents a dielectric constant in a free space, $\epsilon_r$ represents a relative dielectric constant of a dielectric layer, S represents an area of the electrode layer, and d represents a distance between electrodes.

Conventionally, as the above-mentioned sensor sheet, a sheet having a structure, in which a dielectric layer is sandwiched between a pair of electrode layers containing an elastomer having conductive fillers compounded, is known (refer to Patent Document 1). In the sensor sheet, the change in capacitance is large since the dielectric layer is an elastomer.

However, while the capacitance-type sensor sheet used for the contact-pressure distribution sensor is required to have excellent following properties to the deformation or action of a measuring object, the capacitance-type sensor sheet described in the above document cannot adequately satisfy this characteristic. Moreover, a capacitance-type sensor sheet, which is used for a sensor for measuring the amount of stretch deformation and strain and/or the distribution of stretch deformation and strain, is required to have such excellent endurance that the delamination between the electrode layer and the dielectric layer hardly occurs and the electric conductivity of the electrode layer is less reduced (electric resistance is less increased) even when the sensor sheet undergoes large stretch deformation or cyclic deforming.

CITATION LIST

Patent Literature

Patent Literature 1: Japanese Unexamined Patent Publication Application No. 2010-43881

SUMMARY

Technical Problem

Conventional capacitance-type sensor sheets to be used for the contact-pressure distribution sensors can measure a load distribution of the measuring object, but cannot measure the amount of deformation by the load. For example, when the sensor sheet is attached to a soft article like a cushion and a load is applied to the sensor sheet, it is not possible to measure how the cushion is deformed.

The present invention was made in view of such a situation, and it is an object of the present invention to provide a capacitance-type sensor sheet for measuring the amount of stretch deformation and strain and/or the distribution of stretch deformation and strain, which has a large elongation degree and can follow the deformation or action of a flexible measuring object and has excellent endurance for stretch deformation and cyclic deforming, and a method for manufacturing a capacitance-type sensor sheet.

Solution to Problem

The present invention made in order to solve the above-mentioned problem is a capacitance-type sensor sheet used for measuring the amount of stretch deformation and strain and/or the distribution of stretch deformation and strain. The sensor sheet comprises a dielectric layer made of an elastomer, an obverse-side electrode layer laminated on the obverse surface of the dielectric layer, and a reverse-side electrode layer laminated on the reverse surface of the dielectric layer. The obverse-side electrode layer and the reverse-side electrode layer each contain carbon nanotubes. The average thickness of each of the obverse-side electrode layer and the reverse-side electrode layer is 0.1 μm or more and 10 μm or less.

The capacitance-type sensor sheet has a large elongation degree and can follow the deformation or action of a flexible measuring object and has excellent endurance for stretch deformation and cyclic deforming of the sensor sheet by having the above-mentioned constitution. The reason why the capacitance-type sensor sheet achieves the above-mentioned effect by having the above constitution is likely that since the obverse-side electrode layer and the reverse-side electrode layer (hereinafter, also referred to as "a pair of electrode layers") contain carbon nanotubes and their average thicknesses are relatively small like a thickness within the above-mentioned range, the pair of electrode layers exert excellent following properties to the deformation of the dielectric layer, and that since as described above, average thicknesses of the pair of electrode layers are relatively small, the delamination between the pair of electrode layers and the dielectric layer is suppressed.

The obverse-side electrode layer and the reverse-side electrode layer are preferably formed by applying a coating solution containing carbon nanotubes. Thereby, the adhesion between the obverse-side electrode layer and the reverse-side electrode layer, and the dielectric layer can be more improved, and delamination between a pair of electrode layers and the dielectric layer can be more suppressed even when the sensor sheet undergoes large stretch deformation or cyclic deforming.

The average length of the carbon nanotubes is preferably 100 μm or more. Since the pair of electrode layers contain such an ultra-long carbon nanotubes, the capacitance-type sensor sheet can have a larger elongation degree and exert more excellent following properties to the deformation or action of a flexible measuring object.

The obverse-side electrode layer and the reverse-side electrode layer preferably each include a plurality of band-shaped bodies, and the obverse-side electrode layer and the reverse-side electrode layer intersect substantially at a right angle as viewed from the obverse-reverse direction. By employing the above-mentioned constitution, in the capacitance-type sensor sheet, it becomes possible to measure a capacitance while switching between electrode wirings with an external switching circuit when measuring the position and size of the deformation of a measuring object, and thereby, the number of the electrode layers to be arranged and the number of the electrode wirings can be more reduced, and the amount and positional information of the strain of the capacitance-type sensor sheet can be detected.

The elongation rate in a direction of one-axis of the capacitance-type sensor sheet is preferably 30% or more. It is possible to effectively exert excellent following properties to the deformation or action of a flexible measuring object by setting the elongation rate of the capacitance-type sensor sheet to a level of 30% or more.

The amount of the carbon nanotubes is preferably 50% by mass or more of the total solids content each of the obverse-side electrode layer and the reverse-side electrode layer. By employing such a content ratio of the carbon nanotube, a reduction in the electric conductivity (increase in electric resistance) of the obverse-side electrode layers 01A to 16A can be more suppressed even when the sensor sheet undergoes cyclic deforming, and the sensor sheet can be more superior in endurance.

The obverse-side electrode layer and the reverse-side electrode layer preferably each essentially consist of carbon nanotubes. By employing such a constitution, a reduction in the electric conductivity (increase in electric resistance) of the obverse-side electrode layers 01A to 16A can be further suppressed even when the sensor sheet undergoes cyclic deforming, and the sensor sheet can be further superior in endurance.

As the carbon nanotube, a single-walled carbon nanotube is preferred. By employing such a constitution, the obverse-side electrode layer and the reverse-side electrode layer exert more excellent stretch properties and can more improve the following properties to the dielectric layer.

A method for manufacturing a capacitance-type sensor sheet of the present invention, comprises the steps:

forming a dielectric layer by use of an elastomer material, and laminating electrode layers having an average thickness of 0.1 μm or more and 10 μm or less on each of the obverse surface and the reverse surface of the dielectric layer by applying a coating solution containing carbon nanotubes.

According to the method for manufacturing a capacitance-type sensor sheet, it is possible to efficiently manufacture a capacitance-type sensor sheet which has a large elongation degree and can follow the deformation or action of a flexible measuring object and has excellent endurance for stretch deformation and cyclic deforming.

A sensor used for measuring the amount of stretch deformation and strain and/or the distribution of stretch deformation and strain of the present invention comprises:

said capacitance-type sensor sheet, and a detection circuit connected to an obverse-side electrode layer and a reverse-side electrode layer of the capacitance-type sensor sheet.

Since the sensor uses the capacitance-type sensor sheet of the present invention, it has a large elongation degree and can follow the deformation or action of a flexible measuring object and has excellent endurance for stretch deformation and cyclic deforming.

Advantageous Effects of Invention

As described above, the capacitance-type sensor sheet, which is used for measuring the amount of stretch deformation and strain and/or the distribution of stretch deformation and strain of the present invention, has a large elongation degree and can follow the deformation or action of a flexible measuring object and has excellent endurance for stretch deformation and cyclic deforming.

DETAILED DESCRIPTION

Hereinafter, embodiments of the present invention will be described in reference to drawings.

First Embodiment

<Capacitance-Type Sensor Sheet 1>

Figure 1:
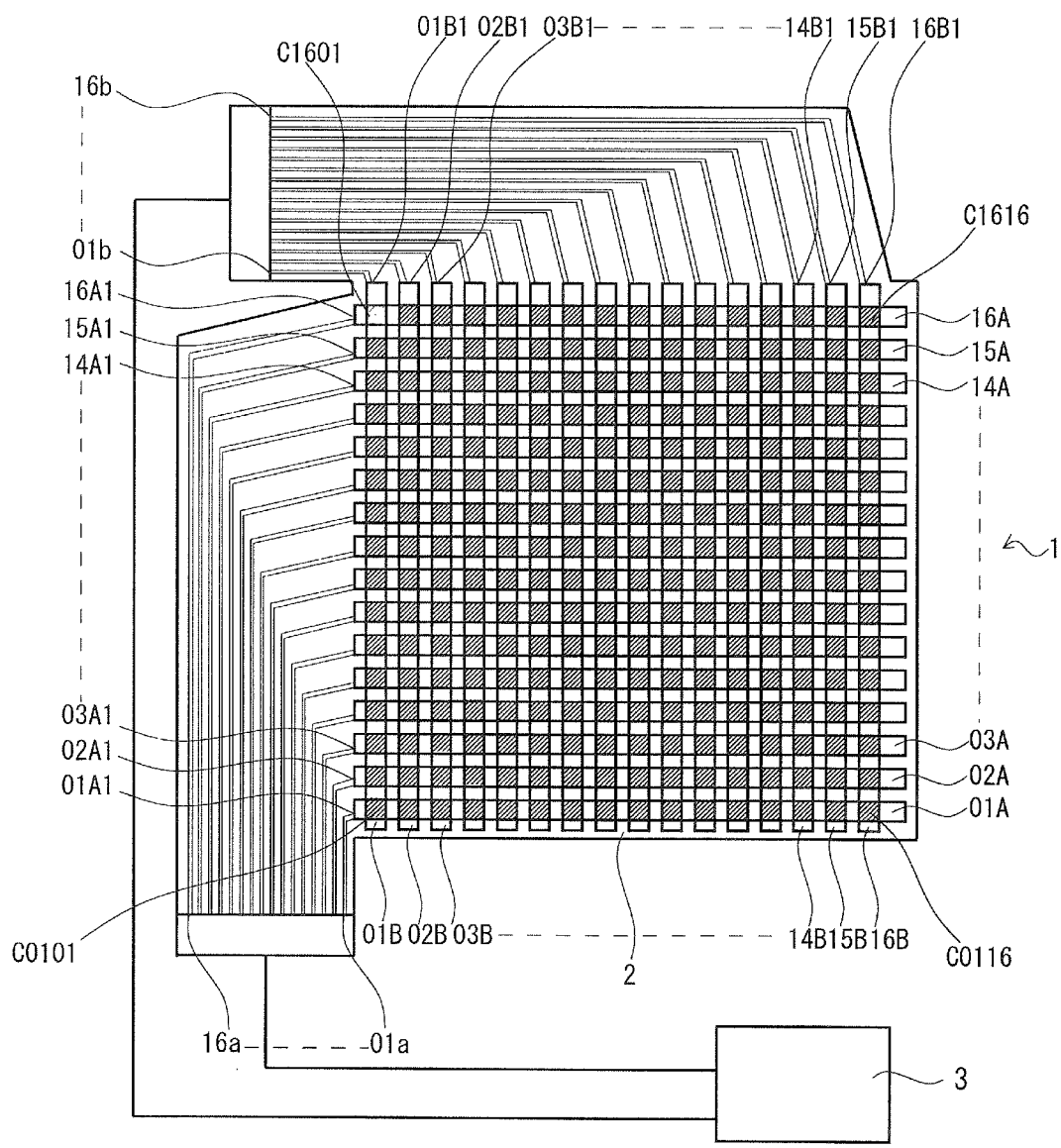
FIG. 1 is a perspective view of a top surface of a capacitance-type sensor sheet 1 of a first embodiment of the present invention.

The capacitance-type sensor sheet 1 shown in FIG. 1 includes a sheet-shaped dielectric layer 2; obverse-side electrode layers 01A to 16A of band-shaped bodies laminated on the obverse surface of the dielectric layer 2; reverse-side electrode layers 01B to 16B of band-shaped bodies laminated on the reverse surface of the dielectric layer 2; obverse-side wirings 01a to 16a; and reverse-side wirings 01b to 16b. Portions, at which the obverse-side electrode layers and the reverse-side electrode layers intersect as viewed from the obverse-reverse (vertical) direction, are detection parts (hereinafter, also referred to as "pixel") C0101 to C1616. In addition, left two-digit "xx" in symbols "Cxxyy" of the detection part (pixel) corresponds to the obverse-side electrode layers 01A to 16A. Right two-digit "yy" in the symbols corresponds the reverse-side electrode layers 01B to 16B.

Design of the average thickness, width and length of the capacitance-type sensor sheet 1 can be appropriately changed in accordance with use of the capacitance-type sensor sheet 1 to be used.

<Dielectric Layer 2>

The dielectric layer 2 is a layer which is elastically deformable. The dielectric layer 2 is formed of a sheet and has, in a plan view, the shape of a rectangle in which an X-direction and a Y-direction forms sides of the rectangle. The dielectric layer 2 is predominantly composed of an elastomer, and for example, it can be composed of a natural rubber, an isoprene rubber, a nitrile rubber (NBR), an ethylene-propylene rubber (EPDM), a styrene-butadiene rubber (SBR), a butadiene rubber (BR), a chloroprene rubber (CR), a silicone rubber, a fluororubber, an acrylic rubber, a hydrogenated nitrile rubber or a urethane rubber. As the elastomer constituting the dielectric layer 2, the silicone rubber and the urethane rubber, which have high tensibility, excellent endurance in the cyclic deforming, and small permanent strain, are preferred; however, a material of the elastomer can be selected and its formulation can be improved in accordance with the measuring object or the measuring purpose.

Further, the dielectric layer 2 may contain additives such as a crosslinking agent, a plasticizer, a vulcanization accelerator and an antioxidant in addition to the above-mentioned elastomer.

Further, the dielectric layer 2 may contain dielectric fillers of barium titanate or the like in addition to the above-mentioned elastomer. When the dielectric layer 2 contains the dielectric fillers, the capacitance C can be increased to enhance detection sensitivity.

The average thickness (T1) of the dielectric layer 2 is preferably 10 μm or more and 1000 μm or less, and more preferably 30 μm or more and 200 μm or less from the viewpoint of increasing capacitance C to improve detection sensitivity and from the viewpoint of improving following properties to the measuring object.

Further, a relative dielectric constant of the dielectric layer 2 at room temperature is preferably 2 or more, and more preferably 5 or more. When the relative dielectric constant of the dielectric layer 2 is less than the above lower limit value, the capacitance is reduce and therefore adequate sensitivity may not be achieved in using the electrode layer as a sensor.

Moreover, a Young's modulus of the dielectric layer 2 is preferably 0.01 MPa or more and 5 MPa or less, and more preferably 0.1 MPa or more and 1 MPa or less. When the Young's modulus is less than the above-mentioned lower limit value, the dielectric layer 2 is too soft, there is a possibility that processing of high quality is difficult and adequate measurement accuracy is not achieved. On the other hand, when the Young's modulus exceeds the above-mentioned upper limit value, there is a possibility that since the dielectric layer 2 is too hard, it interferes with the action of deformation of the measuring object when a deformation-load of the measuring object is small, and therefore measuring results do not meet a measuring purpose.

<Obverse-Side Electrode Layers 01A to 16A>

The obverse-side electrode layers 01A to 16A are respectively formed of a band-shape and composed of 16 electrode layers laminated on the obverse surface of the dielectric layer 2. Each of the obverse-side electrode layers 01A to 16A extends in an X-direction (lateral direction). The obverse-side electrode layers 01A to 16A are respectively arranged at predetermined intervals in a Y-direction (vertical direction) and in nearly parallel to one another. Obverse-side connection parts 01A1 to 16A1 are arranged at left ends of the obverse-side electrode layers 01A to 16A.

Each of the obverse-side electrode layers 01A to 16A has carbon nanotubes. Further, the obverse-side electrode layers 01A to 16A may contain a binding material such as an elastomer in addition to the carbon nanotubes. When the obverse-side electrode layers contain such a binding material, it is possible to improve the adhesion strength between the electrode layers to be formed and the dielectric layer, and to improve the film strength of the electrode layers, and to contribute to securement of environmental safety (toxicity or problem similar to asbestos of the carbon nanotube) at the time when applying a coating solution containing carbon nanotubes. However, the content of the binding material with respect to the total solid content in the electrode layer is preferably small. When the content of the binding material is small, the electrode layer can have less changes in electric resistance against cyclic deforming and hence excellent endurance, and can suppress the inhibition of the deformation of the measuring object.

As the carbon nanotube, for example, single-walled carbon nanotubes and multi-walled carbon nanotubes can be used. Among these carbon nanotubes, the single-walled carbon nanotube having a smaller diameter and a larger aspect ratio is preferred. The average length of the carbon nanotubes is preferably 100 μm or more, more preferably 300 μm or more, and moreover preferably 600 μm or more. The aspect ratio of the carbon nanotube is preferably 1000 or more, more preferably 10000 or more, and particularly preferably 30000 or more. By using such an ultra-long carbon nanotube, the obverse-side electrode layers 01A to 16A exert excellent stretch properties to enable to improve following properties to the deformation of the dielectric layer 2. The reason why the single-walled carbon nanotube is preferred is estimated as follows. That is, it is thought that the single-walled carbon nanotube having a smaller diameter is highly flexible, and on the other hand, the multi-walled carbon nanotube having a larger diameter is rigid, and therefore the carbon nanotube increases in length like a spring when the deformation is added by employing the single-walled carbon nanotube to exert high following properties to the deformation.

Examples of the material of an elastomer include a natural rubber, an isoprene rubber, a nitrile rubber (NBR), an ethylene-propylene rubber (EPDM), a styrene-butadiene rubber (SBR), a butadiene rubber (BR), a chloroprene rubber (CR), a silicone rubber, a fluororubber, an acrylic rubber, a hydrogenated nitrile rubber and a urethane rubber. Among these, the fluororubber is preferred.

As the above-mentioned binding material, a raw rubber (a natural rubber and a synthetic rubber not vulcanized) is also preferred. As described above, when a material having relatively weak elasticity is used, the following properties of the obverse-side electrode layers 01A to 16A to the deformation of the dielectric layer 2 can be enhanced.

Further, the obverse-side electrode layers 01A to 16A may contain a variety of additives in addition to the carbon nanotubes and the elastomer material. Examples of the additives include a dispersant for dispersing the carbon nanotubes, a crosslinking agent for the binder, a vulcanization accelerator, a vulcanization aid, an antioxidant, a plasticizer, a softening agent, and a coloring agent. For the purpose of improving the electric conductivity of the electrode layer, a technique of using, as a dopant, a low molecular material such as a charge transfer material or an ionic liquid for a coating material or an additive is conceivable; however, adequate electric conductivity can be secured without performing a particular treatment by employing carbon nanotubes having a high aspect ratio to the electrode layer. Further, when the low molecular material is used, there is possibility to cause a reduction of an electrically insulating property (a reduction of volume resistivity) of the dielectric layer which is thought to be due to a migration of the low molecular material to the elastomer of the dielectric layer or the plasticizer in the elastomer of the dielectric layer, a reduction of endurance of the sensor sheet against the cyclic deforming, and a reduction of reliability of measured values. Accordingly, the obverse-side electrode layer preferably does not contain the low molecular material.

The amount of the carbon nanotubes in the obverse-side electrode layers 01A to 16A is preferably 50% by mass or more, more preferably 70% by mass or more, and particularly preferably 90% by mass or more of the total solids content contained in the obverse-side electrode layers 01A to 16A. Further, the obverse-side electrode layers 01A to 16A preferably have a constitution of not containing the elastomer material. When the content ratio of the material other than the carbon nanotube serving as a conductive material is reduced as described above, a reduction in the electric conductivity (increase in the electric resistance) of the obverse-side electrode layers 01A to 16A can be suppressed even when the sensor sheet undergoes cyclic deforming, and the sensor sheet can be superior in endurance.

Further, the average thickness of each of the obverse-side electrode layers 01A to 16A is 0.1 μm or more and 10 μm or less. By setting the average thickness of the obverse-side electrode layers 01A to 16A within the above-mentioned range, the obverse-side electrode layers 01A to 16A can exert excellent following properties to the deformation of the dielectric layer 2. When the average thickness is less than 0.1 μm, there is possibility that electric conductivity may be insufficient resulting in a reduction of measuring accuracy. On the other hand, when the average thickness is more than 10 μm, the sensor sheet becomes hard by the reinforcing effect of the carbon nanotube and therefore the following properties to the measuring object may be deteriorated to interfere with the deformation. Further, in the present description, "the average thickness of the electrode layers" was measured by using a laser microscope (VK-9510 manufactured by KEYENCE Corporation). A specific method of measuring the average thickness will be described. The electrode layer laminated on the surface of the dielectric layer is scanned in increments of 0.01 μm in a direction of thickness to measure a three-dimensional shape, and then an average height of a rectangular area 200 μm length×200 μm wide is measured in each of a region where the electrode layer is laminated on the surface of the dielectric layer and a region where the electrode layer is not laminated, and a difference in the average height between the two areas is taken as an average thickness of the electrode layer.

Further, the obverse-side electrode layer, which is laminated in an average thickness of 0.1 μm or more and 10 μm or less, is black and semitransparent and has a visible light transmittance of 0% to 70%.

<Reverse-Side Electrode Layers 01B to 16B>

The reverse-side electrode layers 01B to 16B are respectively formed of a band-shape and composed of 16 electrode layers laminated on the reverse surface of the dielectric layer 2. The reverse-side electrode layers 01B to 16B are arranged so that each of the reverse-side electrode layers 01B to 16B intersects the obverse-side electrode layers 01A to 16A substantially at a right angle as viewed from the obverse-reverse direction. That is, each of the reverse-side electrode layers 01B to 16B extends in a Y-direction. Further, the reverse-side electrode layers 01B to 16B are respectively arranged at predetermined intervals in an X-direction and in nearly parallel to one another. Reverse-side connection parts 01B1 to 16B1 are arranged at front ends of the reverse-side electrode layers 01B to 16B.

Since the constitution of the reverse-side electrode layers 01B to 16B is substantially similar to that of the obverse-side electrode layers 01A to 16A described above, description of that will be omitted.

<Obverse-Side Wiring 01a to 16a>

The obverse-side wirings 01a to 16a are formed of a line, and each of them connects the obverse-side connection parts 01A1 to 16A1 to the detection circuit. A material constituting the obverse-side wirings 01a to 16a is not particularly limited, and as the material, a well-known material can be used; however, it is preferred to used the same as the above-mentioned material constituting the obverse-side electrode layers 01A to 16A since the obverse-side wirings 01a to 16a can also be elastically deformed and therefore they do not interfere with the deformation of the sensor sheet by the measuring object. That is, the obverse-side wirings preferably have a smaller content ratio of a material other than the carbon nanotube serving as a conductive material, and more preferably have a constitution of not containing an elastomer material.

<Reverse-Side Wirings 01b to 16b>

The reverse-side wirings 01b to 16b are formed of a line, and each of them connects the reverse-side connection parts 01B1 to 16B1 to the detection circuit. A material constituting the obverse-side wirings 01a to 16a is substantially similar to that of the obverse-side wirings 01a to 16a, and therefore description of that will be omitted.

<Detection Part (Pixel) C0101 to C1616>

The detection parts (pixel) C0101 to C1616, as indicated by hatching in FIG. 1, are arranged at a location at which the obverse-side electrode layers 01A to 16A and the reverse-side electrode layers 01B to 16B intersect (overlapped portion) as viewed from the vertical direction. The number of the arranged detection parts (pixel) C0101 to C1616 is 256 (16×16) and the number of pixels is 256. When a pair of the electrode layers are drawn from each pixel, 512 (256×2 electrodes) wirings are required, but if the band-shaped electrodes are intersected with one another like the present embodiment, the required number of wirings can be 32 (16+16). This becomes possible by measuring the capacitance while switching 256 pixels one by one by switching 16 wirings by use of an external switching circuit. Consequently, the amount of stain of each pixel and the positional information of stain of the sensor sheet can be detected. The detection parts C0101 to C1616 are arranged at regular intervals over almost the entire surface of the capacitance-type sensor sheet 1. Each of the detection parts C0101 to C1616 includes part of the obverse-side electrode layers 01A to 16A, part of the reverse-side electrode layers 01B to 16B and part of the dielectric layer 2.

<Advantages>

In the capacitance-type sensor sheet 1 of the present invention, a change amount ΔC in capacitance is detected from the capacitance C before placing the measuring object and the capacitance C after placing the measuring object, and thereby, the distribution of stretch deformation and strain can be determined. The capacitance-type sensor sheet 1 of the present invention has a large elongation degree, and can be stretched by 100% repeatedly in a direction of one-axis, and the sheet is not broken even if stretched by 300%. Moreover, the sensor sheet can follow the deformation or action of a flexible measuring object, has excellent endurance for stretch deformation and cyclic deforming, and can trace the shape of the measuring object or directly detect the motion of the measuring object.

<Method for Manufacturing Capacitance-Type Sensor Sheet 1>

Next, the method for manufacturing the capacitance-type sensor sheet 1 will be described. The method for manufacturing a capacitance-type sensor sheet 1 includes a step of forming a dielectric layer by use of an elastomer material (hereinafter, also referred to as "dielectric layer forming step"), and a step of laminating electrode layers respectively having the average thickness of 0.1 μm or more and 10 μm or less on the surface and the reverse surface of the dielectric layer by applying a coating solution containing carbon nanotubes (hereinafter, also referred to as "electrode layer laminating step").

[Dielectric Layer Forming Step]

Figure 12:
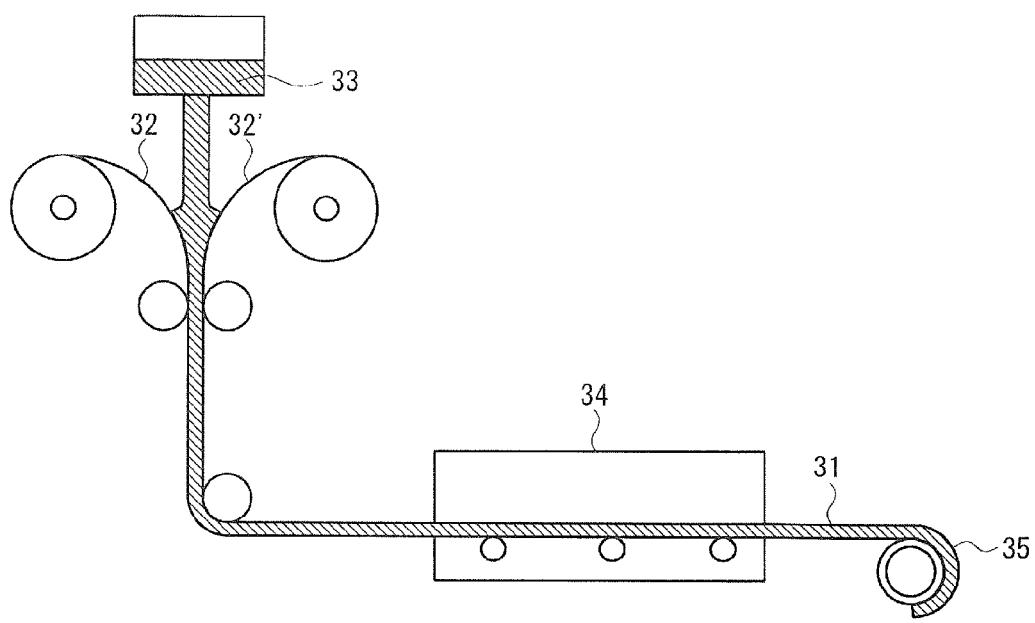
FIG. 12 is a schematic view of a film forming apparatus for a dielectric layer in the case where a urethane rubber is used as an elastomer constituting a dielectric layer in a "dielectric layer forming step" of the method for manufacturing a capacitance-type sensor sheet of the present invention.

In the present step, the dielectric layer 2 is formed from an elastomer material. First, an elastomer material, which is formed by adding, as required, a dielectric filler, a cross-linking agent, a vulcanization accelerator, an antioxidant, and the like to the elastomer, is prepared. The elastomer material and a method of forming the dielectric layer are not particularly limited, and well-known material and method can be used, and an example of a manufacturing process of the dielectric layer 2, which is employed in the case of using a urethane rubber as an elastomer for constituting the dielectric layer 2, will be described below. A castor oil-modified polyol (trade name "2T-5008S OHv=13.6" manufactured by HOKOKU CORPORATION), a tris(2-ethylhexyl)trimellitate plasticizer (trade name "TOTM" manufactured by DAIHACHI CHEMICAL INDUSTRY CO., LTD.), and an antioxidant (trade name "Irganox 1010" manufactured by Ciba Specialty Chemicals Inc.) were weighed and mixed/stirred at 95 rpm at 80° C. for 60 minutes under reduced pressure. Next, a mixed solution was weighed, its temperature is adjusted to 100° C., and then a catalyst (trade name "Ucat 2030" manufactured by San-Apro Ltd.) is added and the resulting mixture is stirred for 1 minute with AJITER. Thereafter, a predetermined amount of isocyanate (trade name "MILLIONATE MT" manufactured by Nippon Polyurethane Industry Co., Ltd.) is added, and the resulting mixture is stirred for 90 seconds with AJITER, and immediately, the mixed solution is injected into a forming apparatus shown in FIG. 12, and a formed sheet is cross-linked/cured while being carried in a state of being sandwiched between protective films to obtain a rolled sheet with protective films, which has a predetermined thickness. A dielectric layer 2 can be manufactured by allowing the rolled sheet to further cross-link for 10 to 60 minutes in a furnace adjusted at 100° C. The dielectric layer 2 is usually formed in an average thickness of 10 μm or more and 1000 μm or less, preferably 50 μm or more and 500 μm or less.

[Electrode Layer Laminating Step]

In the present step, electrode layers respectively having the average thickness of 0.1 μm or more and 10 μm or less are laminated on the surface and the reverse surface of the dielectric layer 2 by applying a coating solution containing carbon nanotubes.

First, carbon nanotubes are added to an organic solvent such as methyl isobutyl ketone (MIBK). An elastomer such as a fluororubber or a dispersant may be further added to the organic solvent, as required. The resulting solvent is dispersed by using a wet type dispersing machine. The solvent is dispersed by using an existing dispersing machine such as an ultrasonic dispersing machine, a jet mill or a beads mill, and thereby, a coating solution containing carbon nanotubes (hereinafter, also referred to as "coating solution of an electrode material") is prepared.

Subsequently, the prepared coating solution of an electrode material is applied in a band shape onto the surface of the dielectric layer 2 by using such as an air brush, and dried. When the elastomer constituting the dielectric layer 2 is a urethane rubber or EPDM other than a silicon rubber, an adhesive force between a coated film formed by the coating solution and the surface of the elastomer is excellent, and therefore there is an advantage that a particular treatment for improving adhesion to the surface of the elastomer is unnecessary. The band-shaped electrodes are, for example, about 1 mm to 20 mm in width and about 50 mm to 500 mm in length, and formed at intervals of about 1 mm to 5 mm so that the electrodes are nearly parallel to one another.

<Advantages>

According to the method for manufacturing a capacitance-type sensor sheet of the present invention, the adhesion between the obverse-side electrode layer and the reverse-side electrode layer, and the dielectric layer can be more improved, and delamination between a pair of electrode layers and the dielectric layer can be more suppressed even when the sensor sheet undergoes large stretch deformation or cyclic deforming.

<Sensor>

The sensor used for measuring the amount of stretch deformation and strain and/or the distribution of stretch deformation and strain of the present invention comprises:

the capacitance-type sensor sheet, and a detection circuit connected to an obverse-side electrode layer and a reverse-side electrode layer of the capacitance-type sensor sheet.

Since the sensor uses the capacitance-type sensor sheet of the present invention, it has a large elongation degree and can follow the deformation or action of a flexible measuring object and has excellent endurance for stretch deformation and cyclic deforming.

As the detection circuit connected to an obverse-side electrode layer and a reverse-side electrode layer, a detection circuit, which detects changes in capacitance between the obverse-side electrode layer and the reverse-side electrode layer, can be appropriately employed. The detection circuit includes, for example, a switching circuit of pixels, a circuit for measuring the capacitance (LCR meter, etc.), a circuit for outputting to a computer, a power source circuit for driving a circuit and a operation part for properly calculating an output value.

Other Embodiment

In addition, the present invention can be embodied in the form in which various modifications and improvements are made in addition to the above embodiment.

That is, the number of the obverse-side electrode layers 01A to 16A and the reverse-side electrode layers 01B to 16B to be arranged in the above embodiment is 16, but the number of electrode layers to be arranged is not particularly limited. Further, an angle, at which the obverse-side electrode layers 01A to 16A and the reverse-side electrode layers 01B to 16B intersect in the above embodiment, is not particularly limited.

Further, it is preferred to have a structure in which a sheet-shaped obverse-side protective layer is arranged above the dielectric layer 2 in the above embodiment, and the obverse-side protective layer covers over the dielectric layer 2, the obverse-side electrode layers 01A to 16A and the obverse-side wirings 01a to 16a from above. Moreover, it is preferred to have a structure in which a sheet-shaped reverse-side protective layer is arranged below the dielectric layer 2 in the above embodiment, and the reverse-side protective layer covers over the dielectric layer 2, the reverse-side electrode layers 01B to 16B and the reverse-side wirings 01b to 16b from beneath. By employing such a constitution, it is possible to prevent continuity between the obverse-side electrode layers 01A to 16A, the obverse-side wirings 01a to 16a, the reverse-side electrode layers 01B to 16B, the reverse-side wirings 01b to 16b and an external member of the capacitance-type sensor sheet 1. The obverse-side protective layer and the reverse-side protective layer are preferably formed in a state containing almost the same base polymer as in the dielectric layer 2. Thereby, high adhesion to the dielectric layer 2 can be obtained.

Further, in the above embodiment, the capacitance-type sensor sheet includes the wirings in addition to the obverse-side electrode layer and the reverse-side electrode layer, but the sensor sheet does not have to include the wirings as long as it includes the obverse-side electrode layer and the reverse-side electrode layer.

EXAMPLES

Hereinafter, the present invention will be described in more detail by way of examples, but the present invention is not limited to the following examples.

<Preparation of Dielectric Layer>

1.1 parts by mass of PERCUMYL D (manufactured by NOF CORPORATION) as a peroxide crosslinking agent was added to 100 parts by mass of EPDM (ESPLENE 600F manufactured by Sumitomo Chemical Co., Ltd.) and kneaded with a roller to obtain a raw rubber. The raw rubber was press-formed at 160° C. for 20 minutes to be cross-linked, and thereby, a dielectric layer having a thickness of 100 µm was prepared.

<Preparation of Electrode Material>

Preparation Example 1

30 parts by mass of VGCF-X (length: 3 µm, aspect ratio: about 200, registered trademark, manufactured by Showa Denko K.K.) as carbon nanotubes was added to 56070 parts by mass of methyl isobutyl ketone (MIBK), and the resulting mixture was subjected to dispersion treatment by a jet mill to obtain a coating solution (A-1).

Preparation Example 2

To the obtained coating solution (A-1), 2113 parts by mass of a fluororubber (DAI-EL™ G-912, manufactured by DAIKIN INDUSTRIES, LTD.) as a rubber material was further added to obtain a coating solution (A-2).

Preparation Example 3

A coating solution (A-3) was obtained in the same procedure as in Preparation Example 1 except for using a Super-Growth CNT (hereinafter, also referred to as "SGCNT") (median value of a fiber diameter: about 3 nm, growth length: 500 µm to 700 µm, aspect ratio: about 100000, carbon purity: 99.9%, provided by National Institute of Advanced Industrial Science and Technology) in place of the above VGCF-X as carbon nanotubes.

Preparation Example 4

30 parts by mass of the above-mentioned SGCNT as carbon nanotubes was added to 56070 parts by mass of methyl isobutyl ketone (MIBK), and the resulting mixture was subjected to dispersion treatment by a jet mill to prepare a coating solution, and to this, 2113 parts by mass of a fluororubber (DAI-EL™ G-912, manufactured by DAIKIN INDUSTRIES, LTD.) as a rubber material was further added to obtain a coating solution (A-4).

Comparative Preparation Example 1

To 429 parts by mass of EPDM (ESPLENE 600F manufactured by Sumitomo Chemical Co., Ltd.), 30 parts by mass of the above VGCF-X as carbon nanotubes, 607 parts by mass of a insulating oil (Transformer Oil G manufactured by Idemitsu Kosan Co., Ltd.) as a plasticizer, 10.7 parts by mass of flower of zinc (manufactured by HakusuiTech Co., Ltd.) as a sulfur crosslinking agent, 2.1 parts by mass of stearic acid (manufactured by Kao Chemical), 3.6 parts by mass of SEIMI OT (manufactured by NIPPON KANRYU INDUSTRY CO., LTD.), 6.0 parts by mass of accelerator SANCELER EM-2 (manufactured by SANSHIN CHEMICAL INDUSTRY CO., LTD.) and 2.6 parts by mass of accelerator NOCCELER MSA (OUCHI SHINKO CHEMICAL INDUSTRIAL CO., LTD.) were added, and the resulting mixture was kneaded/dispersed with a roller and press-formed to be cross-linked, and thereby, an electrode sheet (a-1) having a thickness of 40 µm was prepared.

<Preparation of Capacitance-Type Sensor Sheet>

Examples 1 to 4

The obtained coating solutions (A-1) to (A-4) were applied in the shape of a band onto the obverse surfaces of the dielectric layers prepared above, respectively, with an air brush, and dried. Five band-shaped electrodes having an average thickness of about 1 µm, a width of 10 mm and a length of 100 mm were formed at 5 mm intervals. Subsequently, the coating solution was applied onto the reverse surface of the dielectric layer so as to be orthogonal to the band-shaped electrodes on the obverse surface to form reverse-side electrode layers similarly. Both ends of these band-shaped electrodes were reinforced by a copper foil having a thickness of 0.1 mm, and leads of external wirings were connected by screw clamp.

Comparative Example 1

Further, the electrode sheet (a-1) was cut into a band shape, and each band-shaped sheet was bonded to the obverse surface and the reverse surface of the dielectric layer prepared above so that the band-shaped electrode on the obverse surface is orthogonal to the band-shaped electrode on the reverse surface to prepare a capacitance-type sensor sheet of Comparative Example 1. Each band-shaped electrode layer was formed so that an average thickness is 40 μm, a width is 10 mm and a length is 100 mm.

<Evaluation>

The prepared capacitance-type sensor sheets were evaluated as follows.

[Measurement of Changes in Electric Resistance Against Cyclic Deforming]

Figure 7:
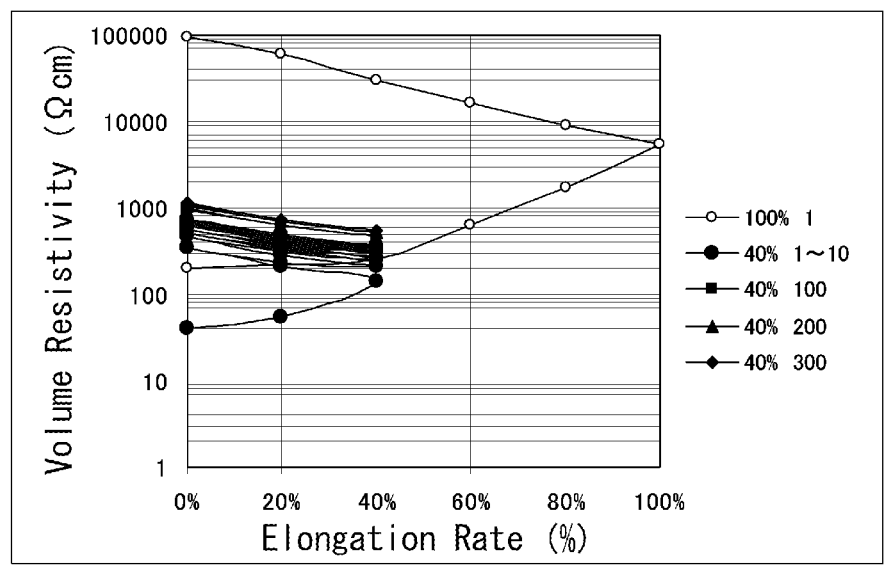
FIG. 7 is a graph of measurement results in <Measurement of Changes in Electric Resistance against Cyclic Deforming> carried out by using a capacitance-type sensor sheet of Comparative Example 1.

The elongation deformation in which the sensor sheet was stretched by 100% in a direction of one-axis was repeated and electric resistance between both ends of the band-shaped electrode was measured. The band-shaped electrode was 20 mm in width and 50 mm in length. First, the sensor sheet was stretched by 100% in a direction of one-axis once to add a hysteresis of deformation to the sheet, and this procedure was repeated, and the changes in electric resistance were measured. The results of Examples 1 to 4 are shown in FIGS. 3 to 6, respectively, and the result of Comparative Example 1 is shown in FIG. 7. It is assumed that the smaller an increase of electric resistance is, the less electric conductivity is reduced, and the better the endurance for cyclic deforming is. Here, in FIG. 3 to FIG. 7, the lowest line in each drawing represents the change in electric resistance in stretching the sensor sheet by 100% (in an outward process) in a direction of one-axis at the first time, and another line (an upper line), which extends from a point representing an electric resistance value at the time of an elongation rate of 100%, represents the change in electric resistance in returning from the elongation rate of 100% to an elongation rate of 0% at the first time (in a return process). The outward process and the return process are combined into one first cycle. Similarly, two lines, which extend from a point where a resistance value at the time of an elongation rate 100% is the second lowest, represents the change in electric resistance in a second cycle, and a lower line of these two lines represents the change in electric resistance in the outward process in the second cycle and an upper line represents the change in electric resistance in the return process in the second cycle. The changes in electric resistance in the third or more cycles are similarly shown in FIG. 3 to FIG. 7.

From the results of FIG. 3 to FIG. 7, it was found that in the sensor sheets of Examples 1 to 4, the electric resistance increased in stretching by 100% at the first time; however, thereafter, the electric resistance comes close to a stable level. On the other hand, in the sensor sheet of Comparative Example 1, the electric resistance significantly increased in stretching by 100% at the first time, and the electric conductivity was reduced to as low level as unmeasurable in several cycles. Also, it was found that in Comparative Example 1, part of the electrode sheet was peeled off from the dielectric layer. It was found that among the sensor sheets of Examples 1 to 4, the sensor sheets of Examples 3 and 4, in which SGCNTs having a high aspect ratio were used as the carbon nanotubes of the electrode layer, have smaller changes in electric resistance even when repeating stretching of the sensor sheet more than 100 times, and have excellent endurance. This is expected to be due to a difference in a shape of the carbon nanotube, and it was found that a single-walled carbon nanotube having a smaller fiber diameter is more excellent than a multi-walled carbon nanotube having a larger fiber diameter, and a long carbon nanotube having a high aspect ratio, whose fiber diameter is more than 100 μm, is more excellent. Moreover, it was found that the sensor sheet of Example 3, in which a rubber component is not contained in the electrode layer, has particularly small changes in electric resistance even when repeating stretching of the sensor sheet more than 100 times, and has particularly excellent endurance.

In addition, as described above in FIG. 3 to FIG. 7, the electric resistance increased only in measurement at the time of stretching by 100% at the first time, and thereafter, the electric resistance becomes stable. In order to provide a sensor having more stable performance, deformation hysteresis may be added in advance after applying the electrode layer. However, since a detection system of the sensor of the present invention is based on the change in capacitance, the sensor sheet has enough electric conductivity even in a deformation state and an electric resistance value of the electrode layer does not have the effect on a measured value. Accordingly, in accordance with the capacitance-type sensor sheet of the present invention, it is possible to provide a sensor having excellent cyclic endurance without having a step of adding the deformation hysteresis in advance.

[Measurement of Changes in Capacitance Against Deformation of Sensor Sheet]

Figure 2:
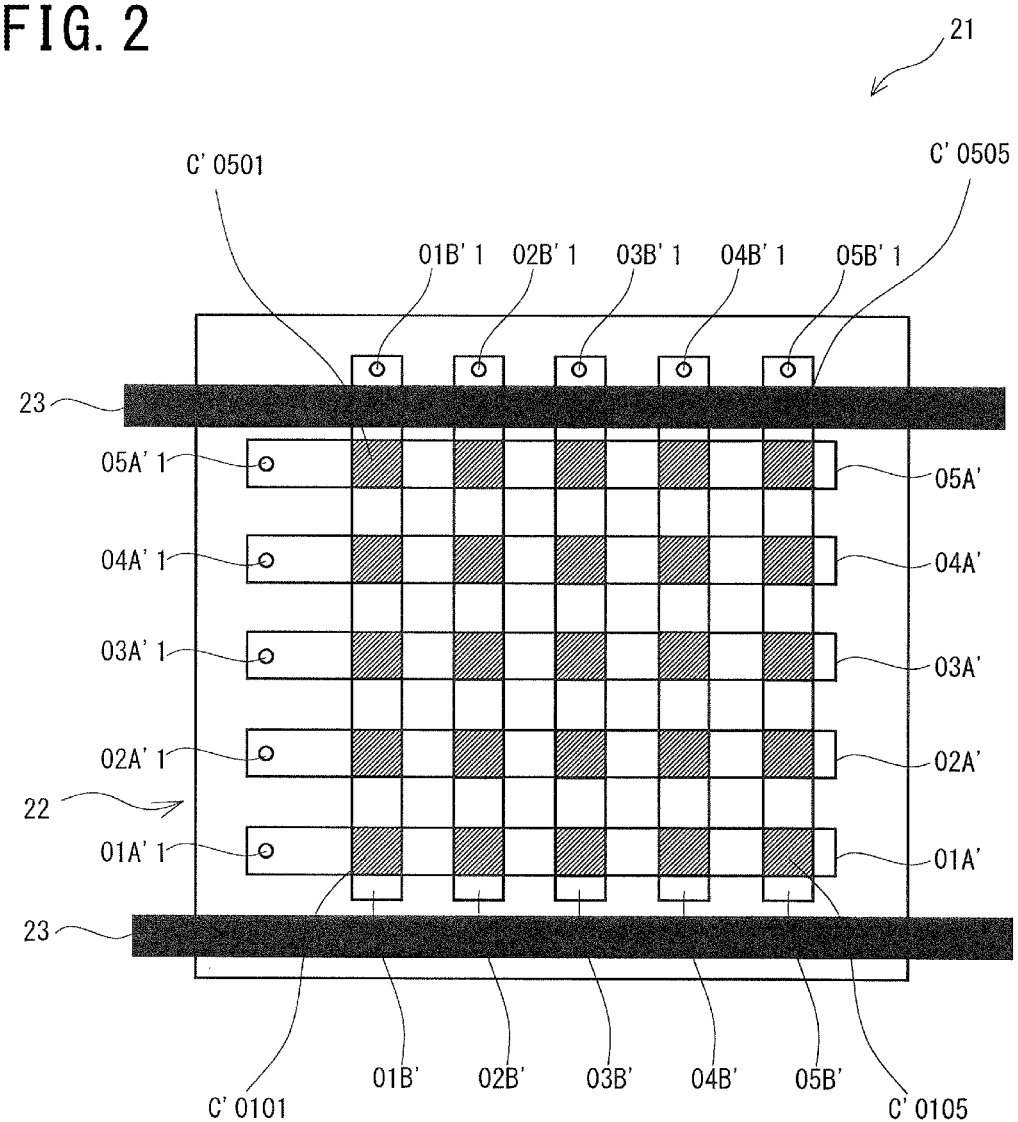
FIG. 2 is a schematic view for explaining a sensor sheet used in <Measurement of Changes in Capacitance against Deformation of Sensor Sheet> in Examples.
Figure 3:
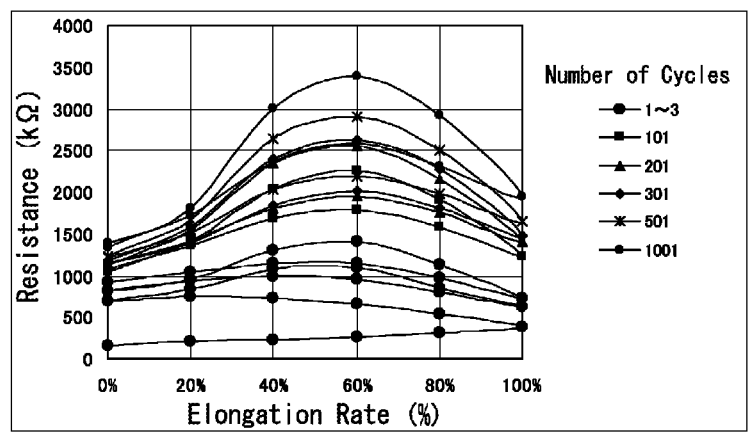
FIG. 3 is a graph of measurement results in <Measurement of Changes in Electric Resistance against Cyclic Deforming> carried out by using a capacitance-type sensor sheet of Example 1.
Figure 4:
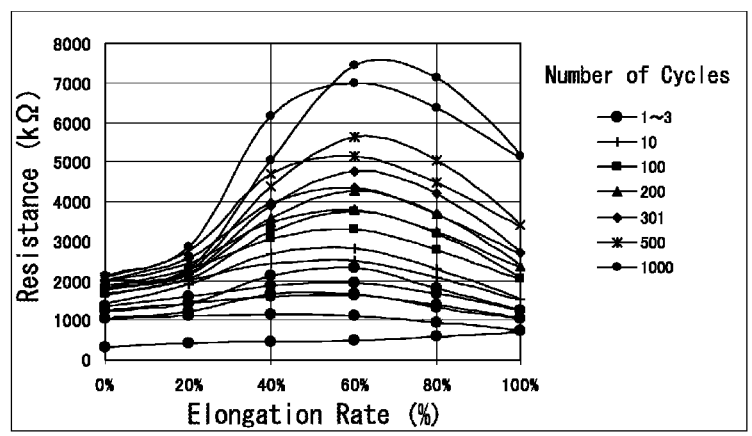
FIG. 4 is a graph of measurement results in <Measurement of Changes in Electric Resistance against Cyclic Deforming> carried out by using a capacitance-type sensor sheet of Example 2.
Figure 5:
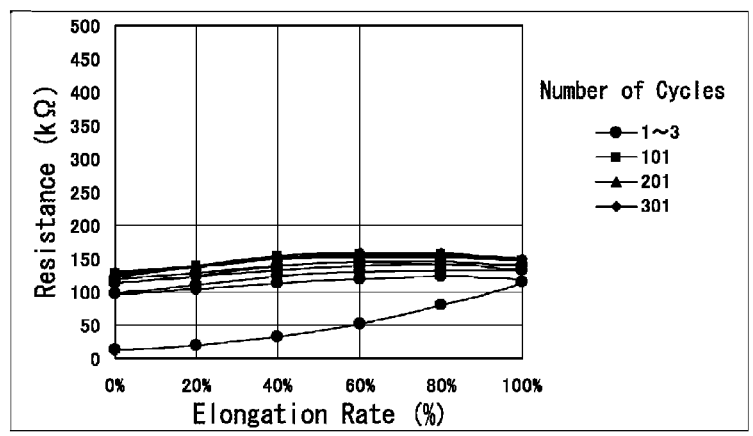
FIG. 5 is a graph of measurement results in <Measurement of Changes in Electric Resistance against Cyclic Deforming> carried out by using a capacitance-type sensor sheet of Example 3.
Figure 6:
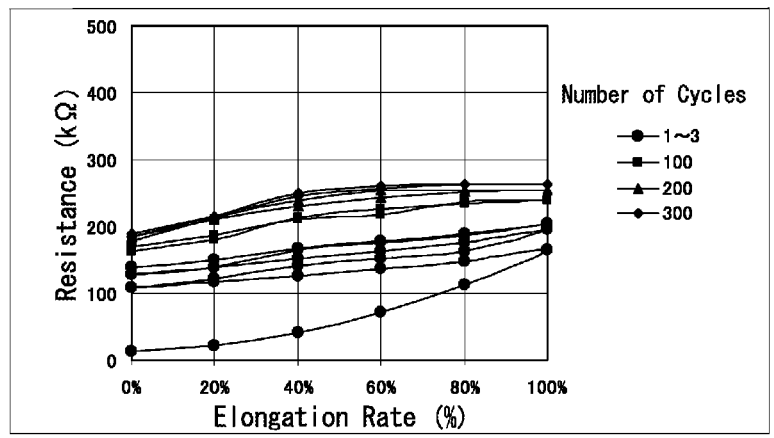
FIG. 6 is a graph of measurement results in <Measurement of Changes in Electric Resistance against Cyclic Deforming> carried out by using a capacitance-type sensor sheet of Example 4.
Figure 8:
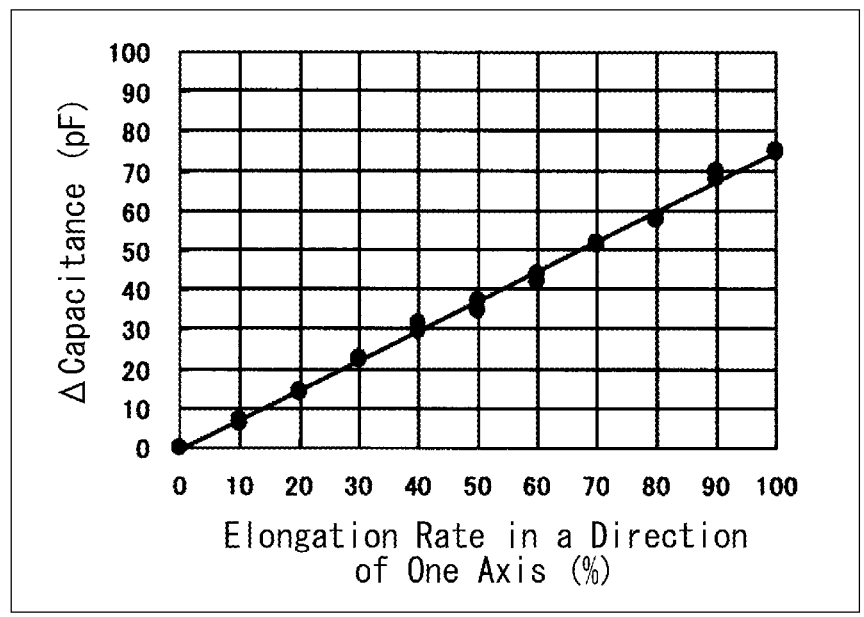
FIG. 8 is a graph of measurement results in <Measurement of Changes in Capacitance against Deformation of Sensor Sheet> carried out by using a capacitance-type sensor sheet of Example 1.
Figure 9:
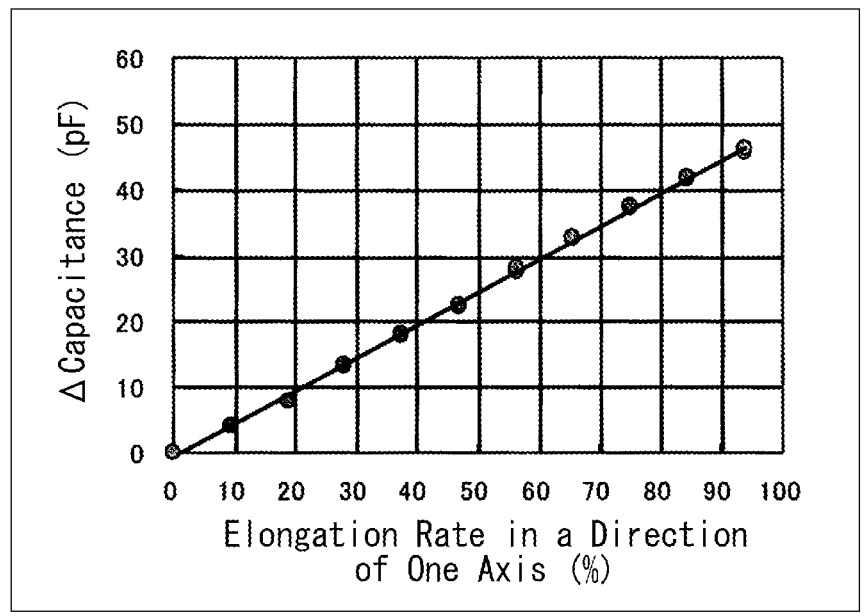
FIG. 9 is a graph of measurement results in <Measurement of Changes in Capacitance against Deformation of Sensor Sheet> carried out by using a capacitance-type sensor sheet of Example 3.

In order to evaluate changes in capacitance against the deformation of the sensor sheet, each of the sensor sheets of Examples 1 to 4 was held at its two sides by a resin frame, as shown in FIG. 2, and the sheet between frames was stretched by 100% in a direction of one-axis, and the change in capacitance was measured. The capacitance was measured by using an LCR meter (LCR HiTESTER 3522-50 manufactured by HIOKI E.E. CORPORATION). An average capacitance of 25 detection parts was plotted with respect to an elongation rate in the elongation in a direction of one axis. The measurement results of the sensor sheets of Example 1 and Example 3 are shown in FIG. 8 and FIG. 9, respectively. In Examples 2 and 4 in which an elastomer is contained in the electrode layer, almost the same results as in FIG. 8 and FIG. 9. In addition, the capacitance of the sensor sheet of Comparative Example 1 was measurable up to the elongation rate of 50%, but it becomes unmeasurable at the elongation rate of 100%.

From the results of FIG. 8 and FIG. 9, it was found that since the capacitances of the sensor sheets of Examples 1 to 4 increase almost linearly with a change rate, the sensor sheets of Examples 1 to 4 are suitably used for a sensor for measuring the amount of stretch deformation and/or the distribution of stretch deformation and strain.

[Measurement of Changes (Repeat Accuracy) in Capacitance Against Deformation of Sensor Sheet Undergoing Cyclic Deforming]

Figure 10:
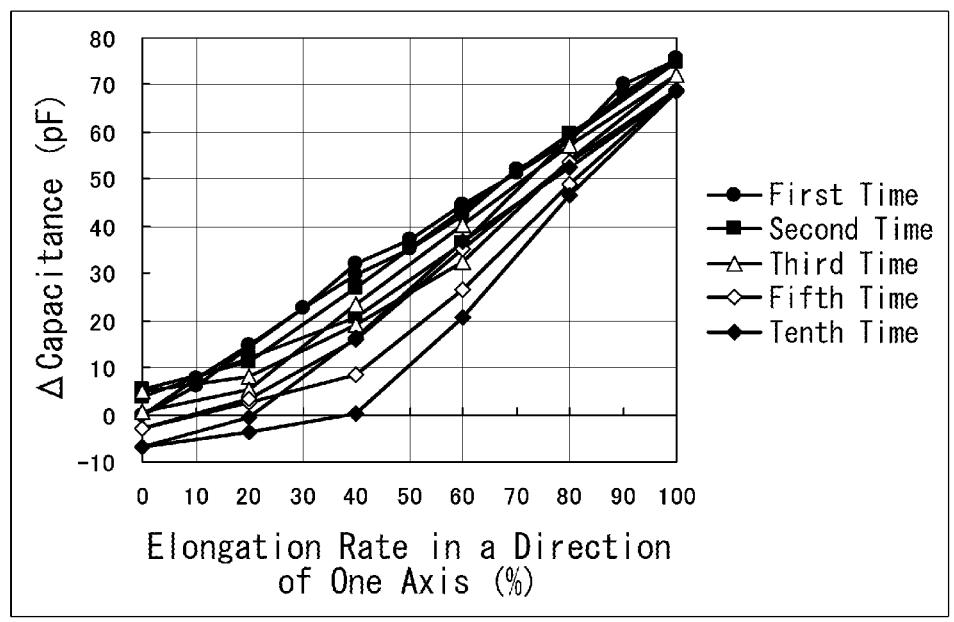
FIG. 10 is a graph of measurement results in <Measurement of Changes (repeat accuracy) in Capacitance against Deformation of Sensor Sheet Undergoing Cyclic Deforming> carried out by using a capacitance-type sensor sheet of Example 1.
Figure 11:
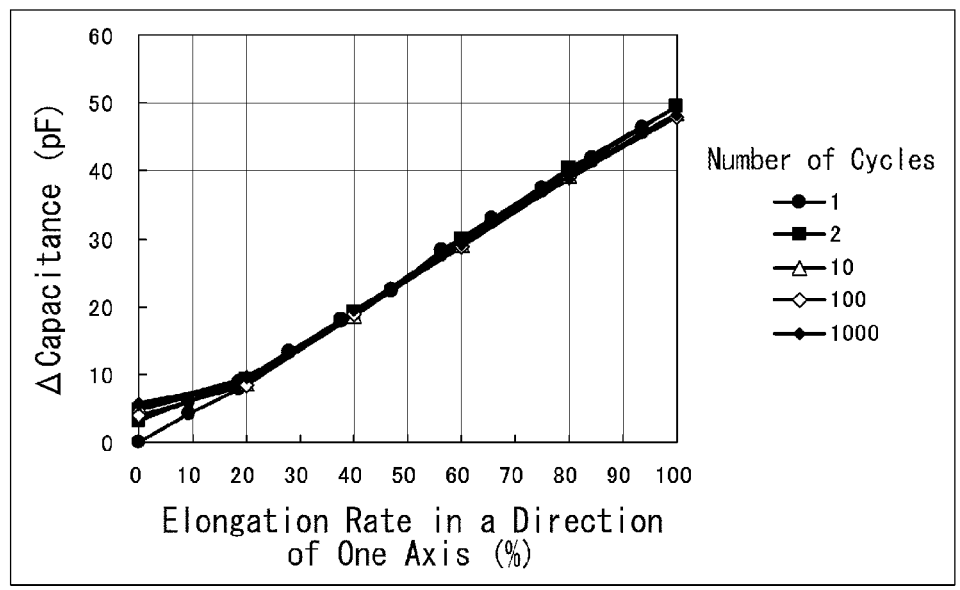
FIG. 11 is a graph of measurement results in <Measurement of Changes (repeat accuracy) in Capacitance against Deformation of Sensor Sheet Undergoing Cyclic Deforming> carried out by using a capacitance-type sensor sheet of Example 3.

Changes in capacitance at the time of repeating the above-mentioned elongation in a direction of one axis of the sensor sheets of Examples 1 to 4 were measured and rated as a repeat accuracy. Consequently, it was found that the ranking of excellence in the repeat accuracy of Examples, from highest to lowest, is Example 3, Example 4, Example 1 and Example 2. The results of the sensor sheets of Example 1 and Example 3 are shown in FIG. 10 and FIG. 11, respectively. In addition, in the sensor sheet of Comparative Example 1, since the electric conductivity is lost due to the hysteresis at the time of stretching by 100% at the first time, the repeat accuracy could not be measured.

It was found from FIG. 10 and FIG. 11 that the sensor sheets of Examples are lower in variations of measurements of capacitances of the sensor sheets undergoing the cyclic deforming than the sensor sheet of Comparative Example, and have excellent repeat accuracy. Further, it was found that the sensor sheets of Examples 1 and 3, in which a rubber component is not contained in the electrode layer, are more superior in the repeat accuracy to the sensor sheets of Examples 2 and 4 in which a rubber component is contained in the electrode layer. Further, it was found that the sensor sheet of Example 3 using carbon nanotubes having a high aspect ratio for the electrode layer is particularly excellent in the repeat accuracy. It is expected that this effect is remarkably exerted since the carbon nanotubes can increase in length like a spring by employing long carbon nanotubes having a high aspect ratio to enable to follow the deformation and therefore a conductive path is hardly cut off even when the deformation is added to the sensor sheet.

INDUSTRIAL APPLICABILITY

The capacitance-type sensor sheet of the present invention, which is used for measuring the amount of stretch deformation and strain and/or the distribution of stretch deformation and strain, has a large elongation degree and can follow the deformation or action of a flexible measuring object and has excellent endurance for stretch deformation and cyclic deforming.

REFERENCE SIGNS LIST

1: CAPACITANCE-TYPE SENSOR SHEET
2: DIELECTRIC LAYER
3: DETECTION CIRCUIT
01A1 to 16A1: OBVERSE-SIDE CONNECTION PART
01A to 16A: OBVERSE-SIDE ELECTRODE LAYER
01a to 16a: OBVERSE-SIDE WIRING
01B1 to 16B1: REVERSE-SIDE CONNECTION PART
01B to 16B: REVERSE-SIDE ELECTRODE LAYER
01b to 16b: REVERSE-SIDE WIRING
C0101 to C1616: DETECTION PART
21: CAPACITANCE-TYPE SENSOR SHEET
22: DIELECTRIC LAYER
23: RESIN FRAME
01A' to 05A': OBVERSE-SIDE ELECTRODE LAYER
01A'1 to 05A'1: OBVERSE-SIDE CONNECTION PART
01B' to 05B': REVERSE-SIDE ELECTRODE LAYER
01B'1 to 05B'1: REVERSE-SIDE CONNECTION PART
C'0101 to C'0505: DETECTION PART
31: DIELECTRIC LAYER
32, 32': PROTECTIVE FILM
33: MIXED SOLUTION FOR POLYURETHANE
34: CROSSLINKING FURNACE
35: WINDING MACHINE

What is claimed is:

1. A capacitance-type sensor sheet used for measuring an amount of stretch deformation and strain and/or distribution of stretch deformation and strain, the sensor sheet comprising:

a dielectric layer made of an elastomer;
an obverse-side electrode layer laminated on the obverse surface of the dielectric layer; and
a reverse-side electrode layer laminated on the reverse surface of the dielectric layer,
wherein the obverse-side electrode layer and the reverse-side electrode layer each contain carbon nanotubes, and
wherein the average thickness of each of the obverse-side electrode layer and the reverse-side electrode layer is 0.1 μm or more and 10 μm or less, and
wherein the sensor sheet is configured such that a measurable change in capacitance is influenced primarily by an increase in a surface area of at least one of the electrode layers as the one electrode layer is deformed in at least one surface direction of the sensor sheet.

2. The capacitance-type sensor sheet according to claim 1, wherein the obverse-side electrode layer and the reverse-side electrode layer are formed by applying a coating solution containing carbon nanotubes.

3. The capacitance-type sensor sheet according to claim 1, wherein the average length of the carbon nanotubes is 100 Jim or more.

4. The capacitance-type sensor sheet according to claim 1, wherein the obverse-side electrode layer and the reverse-side electrode layer each include a plurality of band-shaped bodies, and the obverse-side electrode layer and the reverse-side electrode layer intersect substantially at a right angle as viewed from the obverse-reverse direction.

5. The capacitance-type sensor sheet according to claim 1, wherein an elongation rate in a direction of one axis is 30% or more.

6. The capacitance-type sensor sheet according to claim 1, wherein the amount of the carbon nanotubes is 50% by mass or more of the total solids content of each of the obverse-side electrode layer and the reverse-side electrode layer.

7. The capacitance-type sensor sheet according to claim 1, wherein the obverse-side electrode layer and the reverse-side electrode layer each essentially consist of carbon nanotubes.

8. The capacitance-type sensor sheet according to claim 1, wherein the carbon nanotube is a single-walled carbon nanotube.

9. A method for manufacturing a capacitance-type sensor sheet, comprising the steps of:

forming a dielectric layer from an elastomer material; and
laminating electrode layers having an average thickness of 0.1 μm or more and 10 μm or less on each of the obverse surface and the reverse surface of the dielectric layer by applying a coating solution containing carbon nanotubes,
wherein the sensor sheet is configured such that a measurable change in capacitance is influenced primarily by an increase in a surface area of at least one of the electrode layers as the one electrode layer is deformed in at least one surface direction of the sensor sheet.

* * * * *